United States Patent
D'Ausilio et al.

[15] 3,688,256
[45] Aug. 29, 1972

[54] VEHICLE INTRUSION ALARM SYSTEM

[72] Inventors: Robert F. D'Ausilio, La Mirada; Robert E. Updegraff, Huntington Beach, both of Calif.

[73] Assignee: Threshold Engineering, Inc., Fullerton, Calif.

[22] Filed: April 28, 1971

[21] Appl. No.: 138,221

[52] U.S. Cl. .................... 340/63, 340/51, 340/276, 325/64, 325/117
[51] Int. Cl. ............................................. B60r 25/10
[58] Field of Search......340/51, 63, 64, 65, 224, 258, 340/276, 280, 282, 416; 325/29, 31, 37, 64, 111, 113, 117, 128

[56] References Cited

UNITED STATES PATENTS

| | | |
|---|---|---|
| 3,164,802 | 1/1965 | Kleist et al. .........340/258 C X |
| 3,541,347 | 11/1970 | Carmack.................340/258 C |

*Primary Examiner*—Alvin H. Waring
*Attorney*—Francis X. LoJacono

[57] ABSTRACT

A vehicle intrusion alarm system protects against the pilferage of vehicles, such as trucks, that remain overnight or longer on parking lot. The system is based on the cooperation between a receiver in the parking lot and a transmitter in the vehicle, said transmitter adapted to be activated by the mere act of opening a vehicle door. As soon as an intruder opens such a door, this action causes the transmitter to produce a changing magnetic field; and a pickup wire of the receiver produces a signal voltage that is used to produce an alarm.

19 Claims, 9 Drawing Figures

Patented Aug. 29, 1972

3,688,256

INVENTORS,
Robert F. D'Ausilio, &
Robert E. Updegraff.
by Francis T. LoJacono, Jr.
AGENT Patented Aug. 29, 1972

Robert F. D'Ausilio, &
Robert E. Updegraff,
INVENTORS.

BY Francis V. Lojacono, Sr.

AGENT

Patented Aug. 29, 1972

Robert F. D'Ausilio, &
Robert E. Updegraff,
INVENTORS.

BY Francis X. LoJacono

AGENT

Robert F. D'Ausilio, &
Robert E. Updegraff,
INVENTORS.

VEHICLE INTRUSION ALARM SYSTEM

BACKGROUND OF THE INVENTION

1. Field of the Invention

This invention relates, generally, to an intrusion alarm system and, more particularly, to a vehicle intrusion alarm system when the vehicle is parked in a particular given area.

2. Description of the Prior Art

As is well known, many vehicles carry a valuable cargo, ranging from tools to products (e.g., plumber's tools, television repairman's equipment, dictating machines, salesman's samples, telephone equipment, etc.); and in many cases it is impracticable to unload the vehicle every night.

It is becoming increasingly more difficult to prevent pilferage from these parked vehicles and many schemes have been suggested for solving this problem. Unfortunately, most of these prior-art schemes are complex, expensive and subject to human error, such as forgetting to turn them on and consuming too much power from the vehicle system.

The present intrusion alarm system solves the above problems in a simple, fool-proof manner.

The following brief discussion of prior-art intrusion systems will provide an understanding of the problems, and of the operation and advantages of the disclosed system. For ease of comprehension, it will be presented in terms of a truck parked on a parking lot, but it will be apparent that the disclosed invention has many other uses.

Many of the prior-art intrusion systems provided an alarm when an intruder touched, approached or passed a given barrier, such as a fence, but gave no alarm if the intruder somehow by-passed the barrier (as, for example, by being within the barrier when the intrusion system was turned on). In cases such as these, parked vehicles and the like could be pilfered at leisure without producing an alarm, the alarm being produced only when the intruder was already escaping with his loot. Some other intrusion systems produced an alarm when a body moved within a predetermined area, but due to the required sensitivity of such a system the protected area had to be quite small. Other intrusion systems produced an alarm when a vehicle was driven across a given sensor such as a wire, a lightbeam, an air hose or the like, but such systems did not give any warning that pilferage was impending. Still other systems had alarms attached to the vehicle proper, the concept being that whenever the vehicle was jarred the alarm would sound.

However, most of the prior-art intrusion systems were subject to producing false alarms, and most of them had to be deenergized during daytime activities. Otherwise, they would sound nuisance alarms at undesired times. Moreover, someone had to remember to re-energize the intrusion system when the vehicle was parked for the night.

As may be realized from the above discussion, despite the wide variety of available intrusion systems, none of these prior-art systems were completely satisfactory.

SUMMARY OF THE INVENTION

Broadly stated, the disclosed intrusion alarm system is based on the principle that a changing magnetic field causes a pickup wire to produce a signal voltage. The present application discloses a variety of "transmitters" for producing such a changing magnetic field; one of the transmitters comprising a magnet affixed to a truck door, another transmitter comprising an electro-mechanical means, and another transmitter comprising electronic circuitry. In any case, the changing magnetic field produced by the transmitter induces a signal voltage in a pickup-wire portion of a receiver, and the disclosed circuitry causes the signal voltage to produce an alarm.

Additional circuitry is disclosed for minimizing false alarms and for preventing undesired discharge of the vehicle-power system.

OBJECTS AND ADVANTAGES OF THE INVENTION

It is, therefore, the principle object of the present invention to provide an improved intrusion alarm system.

It is another object of the present invention to provide an improved intrusion alarm system for producing an alarm when a properly equipped vehicle is parked at a properly equipped parking lot.

It is still another object of the present invention to provide an improved intrusion alarm system that is automatic, and is immune to human error.

It is a further object of the present invention to provide an improved intrusion alarm system that is practically impossible to disable prior to intrusion.

It is a still further object of the present invention to provide an improved intrusion alarm system that is simple, inexpensive and easy to manufacture.

A still further object of the present invention is to provide an alarm whenever the vehicle is raised along any portion thereof to prevent tire theft.

DESCRIPTION OF THE DRAWINGS

The attainment of these objects, and others, will be realized from a study of the following description, taken in conjunction with the drawings, of which:

FIG. 8 shows a schematic diagram of the electro-mechanical system; and

FIG. 9 is an elevational view of a cam plate used in the electro-mechanical system.

DESCRIPTION OF THE PREFERRED EMBODIMENT

Principles of Operation

It is well known that an electrical conductor, such as a wire, produces an electrical voltage when it is exposed to a changing magnetic field, the resulting electrical voltage depending in part on the magnitude of the magnetic field, on the rate at which the magnetic field is changing and on other factors.

The disclosed intrusion alarm system is based on the above principle. A receiver, comprising a length of wire, is positioned at a parking lot wherein a vehicle is to be parked, so that when this receiver wire is exposed to a changing magnetic field it will produce an electrical voltage as described above. The manner of producing this electrical voltage will be discussed more fully later.

The receiver further comprises a control unit for amplifying the electrical voltage, controlling various factors such as possible false alarms, etc., and for actuating a utilization device.

The utilization device, a number of forms of which will be discussed later, uses the output of the control unit to provide an alarm of the desired type.

The transmitter—three types of which will be discussed—provides a changing magnetic field in the vicinity of the receiver wire when a door of the parked truck is opened, regardless of whether the door was opened by a key or was forced open.

Figures 1, 2:
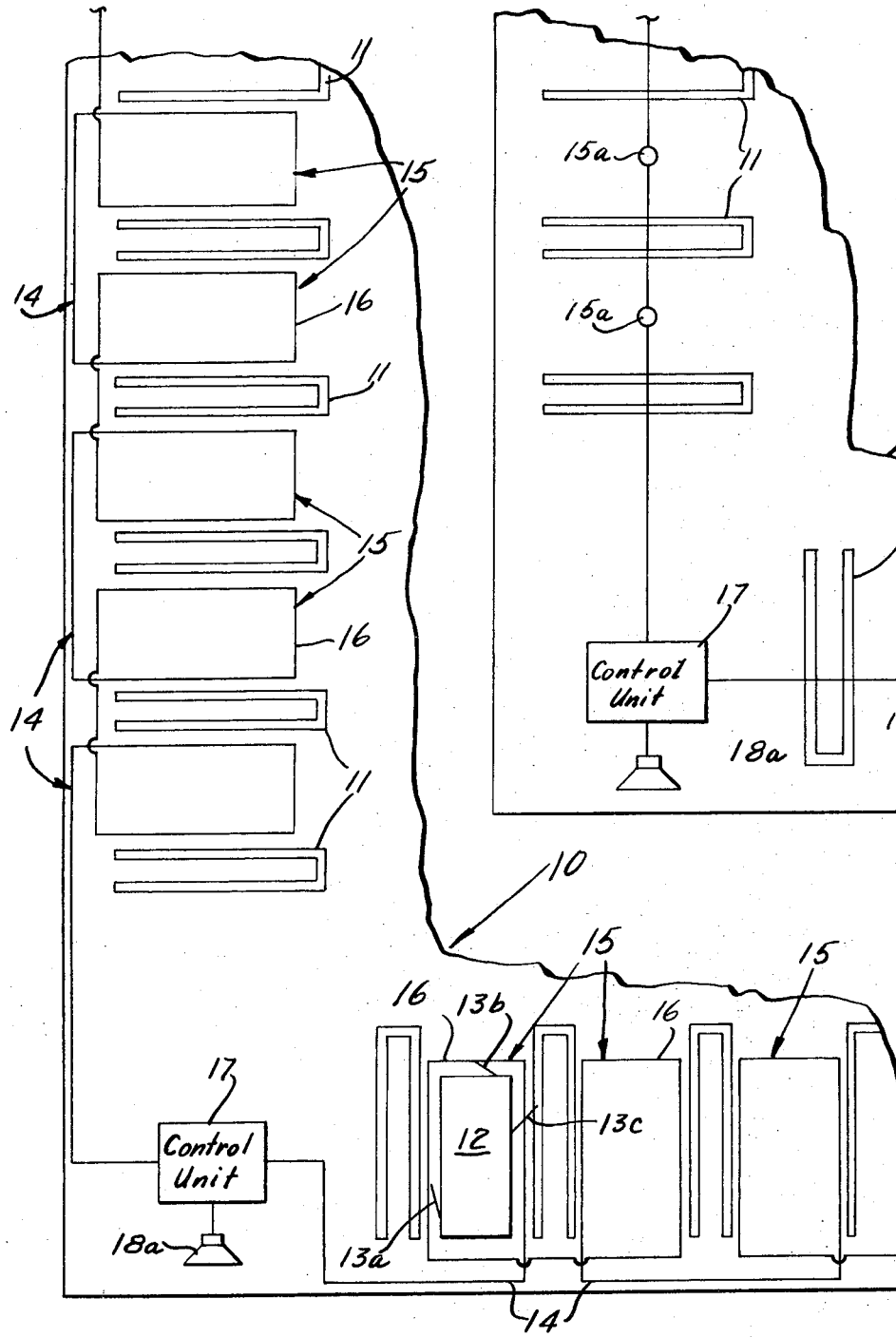
FIG. 1 shows a portion of a parking lot and a truck parked thereon and their cooperation in producing an intrusion alarm.
FIG. 2 shows a portion of a parking lot with an alternative sensing unit.

Referring now to FIG. 1, there is illustrated a portion of a parking lot 10 having a plurality of dividers 11, which may be painted stripes, concrete bumpers, or the like, to provide a plurality of defined parking spaces. A truck 12 is indicated to be positioned in one of the defined parking spaces, several of the truck doors 13a, 13b, 13c being shown opened to different degrees. Parking lot 10 may have a length and width of, typically, 1,000 feet and 200 feet, respectively; and may, if desired, have surrounding fence.

It will be noted that in FIG. 1 parking lot 10 is shown to have a peripherally-positioned pickup loop 14, illustrated as comprising a single "turn" of wire; but, as is known to those skilled in the electronics art, more turns of wire may often be advantageously used. It will also be noted from FIG. 1 that the configuration of pickup loop 14 is such that it has a plurality of secondary loops 15, so that a length of pickup-loop wire 16 extends along each of the defined parking spaces and across the back of each parking space. The reason for this particular pickup-loop configuration will become apparent from the following explanation.

Pickup loop 14 may be formed of any suitable electrically conductive wire of lumped coil of wire, since the electrical voltage produced therein is quite small (in the order of about five microvolts); and, furthermore, there is very little actual flow of electric current in loops 14/15. It should be realized, however, that the wire of the pickup loop may be exposed to weathering, may be subjected to the action of tires rolling across it, may have to withstand scuffing from the shoes of pedestrians, etc. Therefore, the loop wire is preferably mechanically strong.

The loop wire may be fastened to the surface of the parking lot by means of adhesives, by the use of adhesive tapes, etc.; but the loop wire is preferably buried beneath the surface of the parking lot either by slotting the parking surface and burying the wire or by incorporating the wire into a new parking surface, or the like. It has been found that, when buried in the above described manner, ordinary insulated wire is completely satisfactory, and has a suitable life and freedom from galvanic action. However, the loop wire may be installed in metal or plastic conduits around the margin of the enclosed area.

As indicated in FIG. 1, the ends of pickup loop 14 are connected to a control unit 17 that will be discussed later in greater detail; and control unit 17 is, in turn, connected to a utilization device 18a, indicated in FIG. 1 to be a horn.

Transmitter I

FIG. 1 indicates a truck 12 positioned in one of the defined parking spaces, the truck having a plurality of standard and sliding doors 13. When necessary, magnets (not shown) are affixed in any suitable manner to the doors, it being preferable that the magnets are at the outer lower corners of the doors, so that they are as close as possible to the ground, and thus as close as possible to the wires 16 of the secondary pickup loop 15.

It will be realized that, when any of the doors 13 are opened, the door will sweep loop wire 16, as indicated by arrows 19. This movement of the door and its associated local earth's magnetic field is such that a portion of the loop wire 16 is exposed to a changing magnetic field.

To be more specific, when a truck door is first opened (see door 13a), the loop wire is exposed to a weak changing magnetic field produced by the relatively distant ferro-magnetic doors; when the door has opened to such a position that the door is directly above the wire (see door 13b), the wire is exposed to a stronger magnetic field; and when the door is opened even wider (see door 13c), the door is then located on the other side of the wire, so that the wire is now exposed to a weaker magnetic field previously. previously. Thus, regardless of the exact spatial relation between the magnet and the wire, and regardless of the amount that the door is opened, the loop wire 16 is exposed to a changing magnetic field.

Therefore, as explained above, an electrical voltage is induced in the pickup-loop wire; and this voltage is applied, as a signal, to the control unit 17. It will, of course, be realized that the signal voltage may be stronger at some times than at other times, depending upon the height of the door above the wire, depending upon the parking position of the truck, depending upon the rate at which the door is opened, etc.; but the opening of the truck door by an intruder will produce a signal voltage, and electronic circuitry, to be discussed later, compensates for these various factors. However, an alternative arrangement of a lumpwire unit 15a, as shown in FIG. 2, can be used in place of pickup loop 15.

Thus, it will be recognized that, whenever such a suitably equipped truck is parked at a suitably-equipped parking lot, the cooperative system of the transmitter and the receiver will automatically produce an alarm in the event of truck intrusion.

It should be noted, however, that when the truck is being used during its assigned duties the opening and closing of its doors at locations other than the protected parking lot do not produce nuisance alarms. However, when the truck has completed its assigned duties, and is parked in any one of the defined parking spaces, the disclosed intrusion alarm system automatically goes into operation.

Another unexpected advantage accrues to the disclosed intrusion alarm system; namely, it provides an alarm if the truck's engine is started preparatory to stealing the truck. s such a case, the mere turning on the truck's ignition system produces a surge of electricity from the truck's battery; the rotation of the truck's starting motor causes an extremely large flow of electric current; and the resulting activation of the truck's generator or alternator produces a current flow. Each of these electric-current flows produces its own changing magnetic filed; and, therefore, produces a signal voltage and a resulting alarm.

Figure 3:
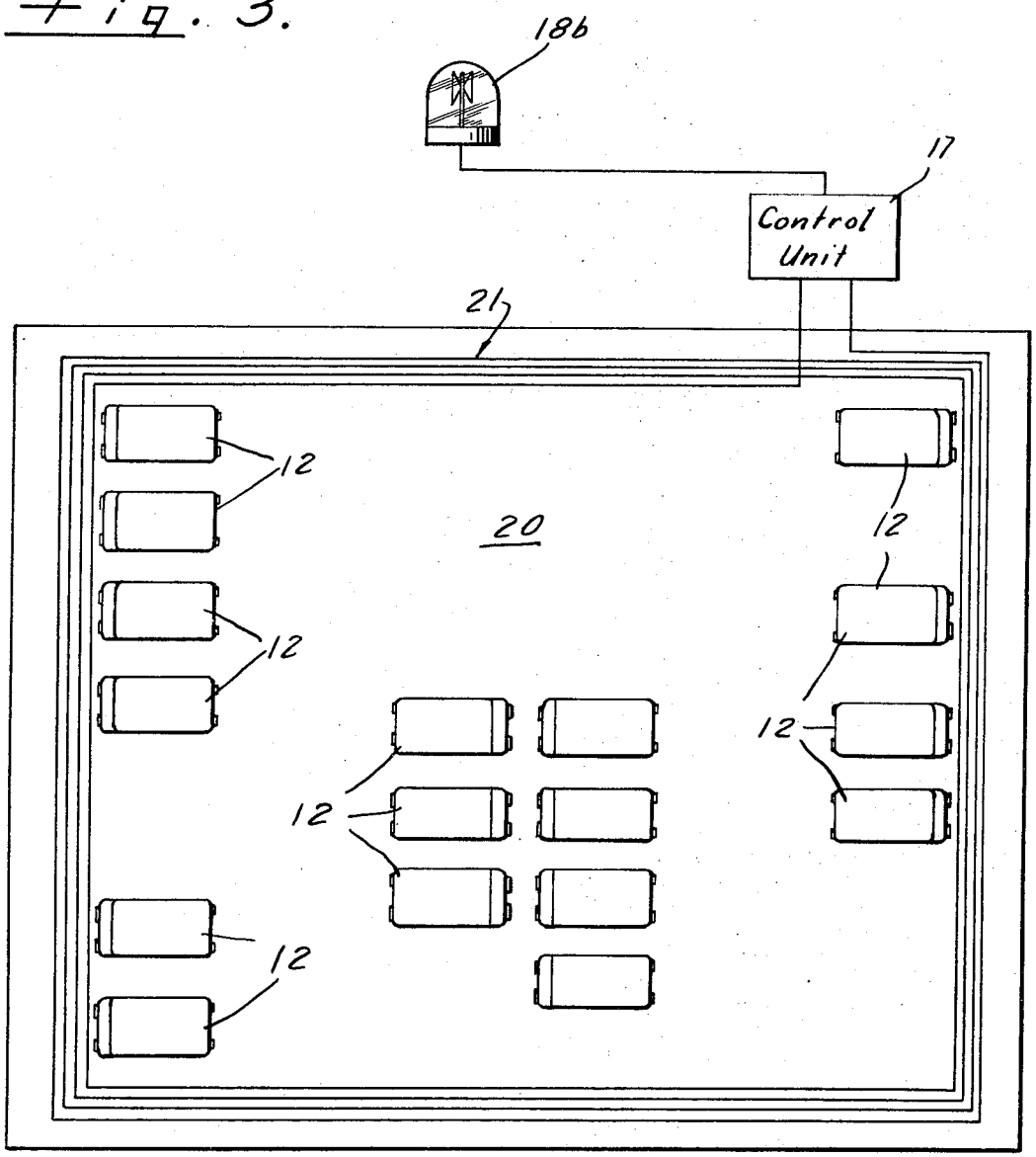
FIG. 3 shows another parking lot having trucks parked thereon, and their cooperation in producing an intrusion alarm.

There is shown in FIG. 3 the configuration, which again illustrates a parking lot 20, having a plurality of trucks 12 parked thereon; but, in this case, defined parking spaces are no longer needed. Parking lot 20 has a pickup loop 21, comprising a suitable number of turns, four such turns being indicated. Pickup loop 21 preferably encircles the parking lot, but the previously disclosed secondary loops are unnecessary. Thus, pickup loop 21 has a much simpler configuration and is much cheaper to install.

The ends of pickup loop 21 are connected, as previously discussed, to a control unit 17; and the output of control unit 17 is applied to a utilization device 18b, indicated to be a rotating lightbeam air-patrol light that may be mounted on a pole, on a tower, on a rooftop, etc. When this light is actuated, its rotating lightbeam instantly attracts the attention of patrolling aircraft.

Figure 4:
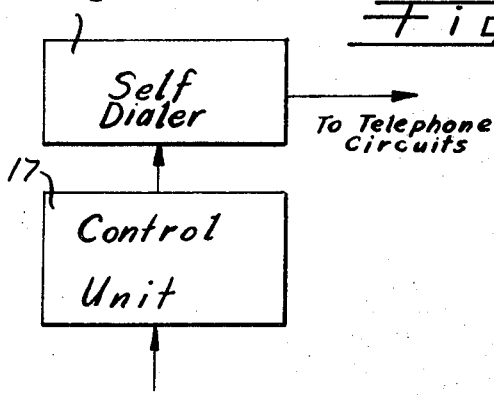
FIG 4 shows a portion of the utilization circuitry.

Still another type of utilization device 18c is indicated in FIG. 4. This is a self-dialer that is connected to the telephone lines. When the self-dialer 18c is actuated by a signal from control unit 17, it may operate in either of two modes, depending upon its type. The first mode of operation is such that is self-dials a predetermined telephone number, and then "telephones" a given tone (either a steady unmodulated tone or a modulated tone that quavers), so that a person, or equipment at the predetermined number can determine the location of the intrusion. Alternatively, in the second mode of operation, the self-dialer also dials a predetermined number, but then it plays a taped recording that identifies the location of the intrusion.

Referring back to FIG. 3, the pickup loop 21 indicated thereon operates in basically the same manner as previously discussed; that is, when a portion of it is exposed to a changing magnetic field, it produces a signal voltage that is applied to control unit 17. The generation of this changing magnetic field will now be discussed.

Figure 5:
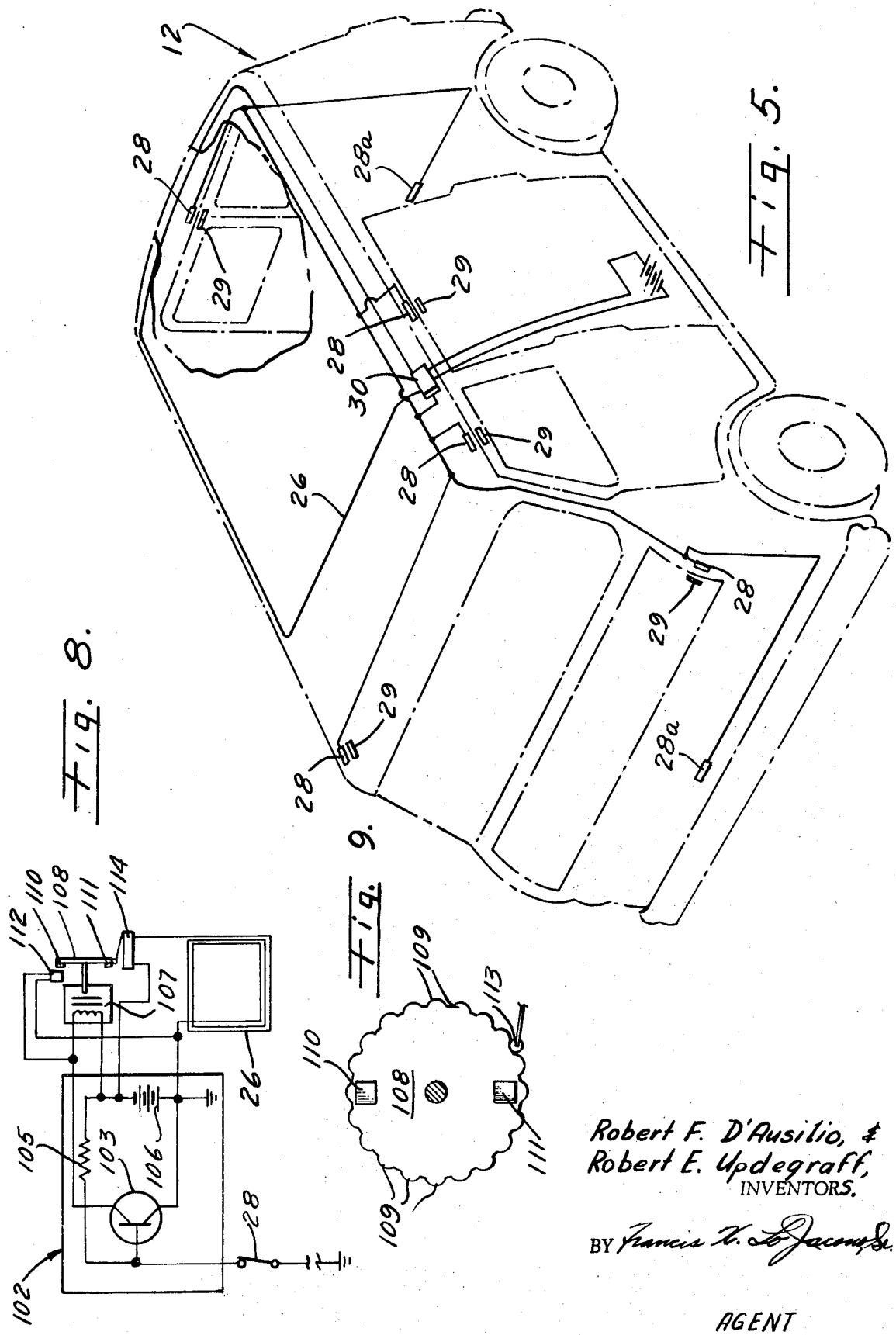
FIG. 5 shows a truck incorporating the transmitter portion of the intrusion alarm system.

The improved transmitter does not use the previously discussed truck doors; rather, this transmitter, as may be seen from FIG. 5, comprises a sending loop 26, of one or more turns of wire, that is mounted on truck 12. For the reasons to be discussed later, the sending loop 26 should preferably be mounted horizontally and as close to the ground as possible. However, because of vehicle construction and the desire to locate the sending loop 26 in a tamper-proof location, the preferred mounting is not always available; and in one particular case it was found that the optimal location for the sending loop 26 was within the vehicle in its roof channel.

By means to be discussed later, an intrusion causes the sending loop 26 to conduct a periodically changing electric current; and this changing electric current produces a changing magnetic field. Since a portion of the pickup loop is spatially located in this changing magnetic field, the pickup loop produces a signal voltage that is used to produce an alarm.

It is obvious that the sending loop 26 of FIG. 5 should produce its changing magnetic field only at the time of an intrusion; and this result is achieved by affixing an electrical switch at each door of the truck (and at its hood, windows, skylight, etc., when desired), regardless of the manner in which they open. These electrical switches are then used to initiate the changing magnetic field.

In the simplist form of the improved transmitter, each door to be protected has its own electrical switch, say one of the mechanical electrical switches that are used to turn on the dome light when the door is opened. However, rather than turning on the dome light, this mechanical electrical switch is used to actuate a thermal switch in the form of a flasher of the type used for the turn signal indicating lamps. It is also obvious that other thermal switches may be used in this system. The now actuated flasher directs intermittent pulses of electricity from the vehicle's battery through sending loop 26, these intermittent pulses of electricity causing sending loop 26 to produce a changing magnetic field, which in turn causes the pickup loop 21 (of FIG. 3) to produce a series of signal voltages.

However, an alternative arrangement can replace the flasher unit which incorporates its function into a miniaturized electronic "printing wiring board" that also contained pulsing circuitry, along with replacing the mechanical electrical switch with a normally open magnetic-reed switch (such as magnet model No. H34–607 and switch model No. MRR–2–185 made by Hamlin, Inc.) that was rated at one-million cycles of operation at the desired load.

FIG. 5 indicates that truck 12 has a plurality of such switches 28 mounted at each door and engine hood to be protected, and centrally positioned mercury switches 28 mounted at the front and rear areas of the vehicle, respectively. These normally open switches 28 are held electrically closed by associated magnets 29 affixed to the doors of the truck. Thus, during the quiescent period, magnets 29 hold switches 28 in a closed state, and no electric current is permitted to flow from the truck battery; but, whenever a door is opened, the magnet 29 is moved away from its associated switch 28, the switch reverting to its normally open state, and thus permitting electric current to flow from the vehicle battery to the pulsing circuit, to be described later.

In this way, when the truck is parked at a protected parking lot, an intrusion that opened any door of the truck automatically opened the magnetic switch at that door, thus activating the pulse circuit and causing the sending loop 26 to produce a changing magnetic field, this changing magnetic field being picked up by the pickup loop 21, which thereupon produces a signal voltage that is used to produce an alarm. However, mercury switches 28a activate the pulsing circuit whenever any portion of the vehicle is raised, causing one or both of said switches to open the circuit. This would generally occur when, for example, tires of the vehicle were about to be removed.

It should be noted that while the truck is being used in its daily assigned duties, away from the protected parking lot, the act of opening the doors still produces a changing magnetic field; but since there is no suitable pickup loop in that vicinity, no alarm is produced.

As indicated in FIG. 5, the various switches 28 and 28a may be connected in series and connected over a common bus wire to pulsing-circuit container 30. This particular wiring arrangement requires that the pulsing-circuit container 30 accept only a single wire from the switches 28, two wires from the sensing loop 26 and two wires from the truck battery; and this, of course, simplifies the problem of external connections to the pulsing circuit. Moreover, the container 30 of the pulsing circuit is not grounded, so that it may be mounted at any convenient location in the truck. A screwed-down connection for grounding purposes is not necessary. Thus, a pulsing-circuit container 30 which is somewhat smaller than a package of cigarettes may be merely taped down, or even left unattached. Because of this wiring arrangement, it is convenient to remove the entire sending loop 26, the pulsing-circuit container 30, the switches 28 and, if desirable, the magnets 29 any time that the system is to be re-installed in another truck.

It was previously pointed out that the sending loop 26 is preferably horizontal and as close as possible to the ground, and, therefore, as close as possible to the pickup loop 21; and the reason for this will be understood from the following discussion. The interaction of two magnetic loops or two magnetic fields is known as their "mutual coupling", a "tight" coupling being associated with a close mutual coupling. Since the disclosed pickup loop is horizontal, and is at or buried slightly below the parking lot surface, optimal mutual coupling is obtained when the sending loop is also horizontal and as close as possible to the pickup loop. This desideratum isn't always achievable but it should be approached as closely as possible.

Ordinarily, a ferrous material, such as iron that is placed between two magnetic loops tends to act as a magnetic "shield" and tends to minimize mutual coupling. Surprisingly, however, the metal truck body (which is made of iron and seems to be placed between the sending loop and the pickup loop) does not introduce a shielding effect; if anything, it seems to enhance the coupling between these two loops. Relatively little seems to be known about the coupling of large loops as used in this invention and it appears that the metal body of the truck acts as a core that improves the magnetic coupling.

It will be apparent that the strongest signal voltage is obtained from the pickup loop when the truck has been parked as close as possible to the peripheral pickup loop 21; but it has been found that by proper selection of the number of turns in the loops, by proper design of the circuit parameters, by suitable choice of amplifier gain, by use of sufficient battery current, etc., a suitable-strength signal voltage may be obtained from the pickup loop, even when the truck is parked an appreciable distance from the edge of the parking lot. This increased sensitivity provides an additional advantage; namely, a late arriving truck may be parked outside of the locked fence and still be protected by the disclosed intrusion alarm system. Polarity loops may be coupled in phase or 180° out of phase to prevent the system sensitivity from decreasing whenever the loops are out of phase. The transmitter is made to generate a bipolar pulse.

Figure 6:
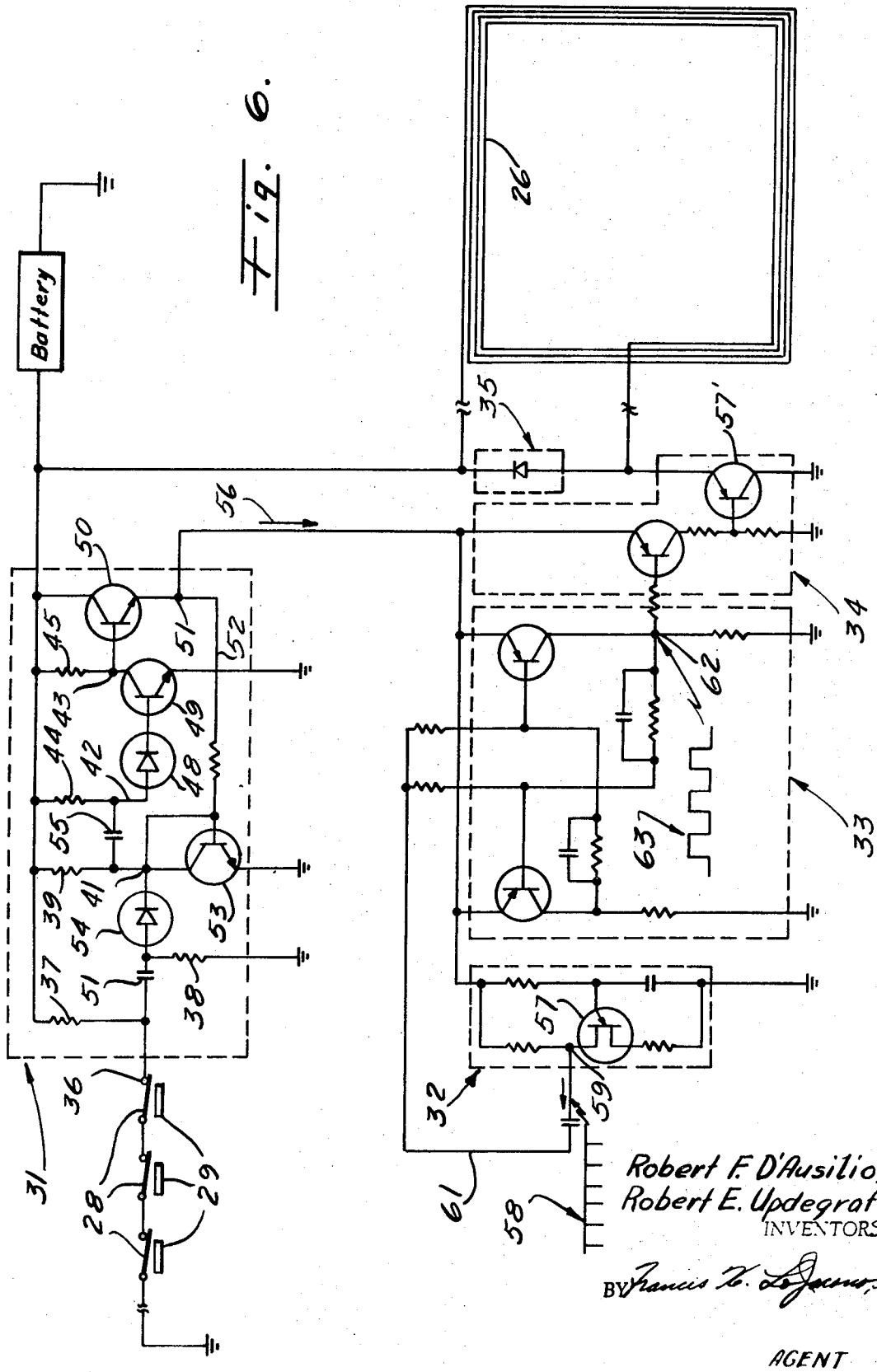
FIG. 6 shows a schematic diagram of an electronic means and electro-mechanical means of the transmitter portion of the system.

It was pointed out above that when any of the truck doors are opened a changing magnetic field is produced, and FIG. 6 shows an electronic circuit that may be used for this transmitter function. The circuit of FIG. 6 comprises five co-acting circuits that will be discussed later in greater detail. The five circuits are as follows: a timing circuit 31, an oscillator circuit 32, a flip-flop circuit 33, an amplifier-circuit driver 34, and a damping circuit 35. Basically, these circuits co-act in the following manner.

When any of the doors of the truck are opened, the timing circuit 31 is activated; and this circuit thereupon provides operating power for all the subsequent circuitry, except transistor 57′, for a given interval of time. The operating power provided by the timing circuit 31 actuates the oscillator circuit 32, which thereupon provides trigger signals to the flip-flop circuit 33, this latter circuit producing a periodically-reversing electric current. The reversing current is then applied to the sending loop 26 located in the truck, this loop then producing the desired reversing (changing) magnetic field. The damping diode 35 minimizes the danger from high-back electromotive force.

Timing Circuit

Referring again to FIG. 6, the upper left hand portion of this drawing shows a plurality of switches 28 that represent the door switches on the truck. A plurality of magnets 29 are indicated as holding switches 28 in a conductive state during the quiescent no-alarm interval.

During this quiescent state, the timing circuit 31 is in its standby state, as follows. With all the switches 28 closed, as indicated, there is no signal being applied to the input terminal 36 of the timing circuit 31; or, stated in another way, input terminal 36 is grounded at battery potential due to the action of resistors 39 and 44. 43 is at ground potential due to the action of transistor 49.

Diode 48 transmits the battery potential at point 42 to the base electrode of transistor 49, so that transistor 49 is saturated on and transistor 50 is cut off since its base electrode potential is too low to permit conduction. Therefore, during the quiescent period, there is no output signal at the timing circuit output terminal 51; in fact, output terminal 51 is at substantially ground potential due to the non-conductivity of transistor 50 and this ground potential is transmitted over wire 52 to hold transistor 53 in its non-conducting state during the quienscent period.

In summary, it will be seen that when all the truck doors are closed the quiescent state of timing circuit 31 does not produce an output signal.

When any of the truck doors is opened, the quiescent state of the timing circuit 31 is changed to an active state, as follows. The opening of a door causes its associated door switch 28 to assume its electrically activated condition; and this condition removes the grounding potential to the input terminal 36 of the timing circuit. Now, due to the action of resistors 37 and 38, diode 54, resistor 39, capacitor 55 and 55', resistor 44 and diode 48, the base electrode of transistor 49 is "downvolted,"i.e., has its erstwhile high potential lowered; and transistor 49 becomes non-conductive. This condition, in turn, upvolts point 43 and causes transistor 50 to become conductive; and now there is an output on terminal 51. This output signal is applied, over wire 56, as an operating power to activate the subsequent portions of the pulsing circuit, the operations of these subsequent portions to be discussed later.

With the production of an output signal at output terminal 51 of the timing circuit 31, this output signal is also applied over wire 52 to the base electrode of transistor 53, turning this transistor on to its conductive state. The non-conductive transistor 53 has the following effect; namely, it electrically connects (clamps) point 41 to ground potential. Now, even if the previously opened truck door is quickly closed, thus electrically closing its associated door switch, point 41 remains electrically clamped to ground; and timing circuit 31 maintains its active state, thus negating the effect of closing the truck door once the intruder enters the truck.

The active state of the pulsing circuit would be maintained until it is turned off manually but this active state may completely discharge the truck battery. In order to avoid this possibility, the duration of the active state is terminated in the following manner. When point 41 is clamped to ground potential by conductive transistor 53 in the manner previously described, capacitor 55 assumes an entirely different environment. Previously, during the quiescent state, both "sides" of capacitor 55 were at substantially battery potential, so that capacitor 55 assumed a quiescent state. During the active state, however, the left side of capacitor 55 has been downvolted to ground potential by the now conductive-clamping transistor 53; the right side of capacitor 55 still being connected through resistor 44 to battery potential. As a result, electricity starts to flow "through" capacitor 55 but, since it is a capacitor, it has the inherent characteristic that it "charges up"; that is, its left side remains clamped to ground potential but its right side is gradually upvolted to assume progressively higher potentials. As a result, point 42, which is electrically connected to the upvolting side of capacitor 55, is also gradually upvolted and, acting through diode 48, gradually upvolts the base electrode of transistor 49. Eventually, the base electrode is upvolted to such a value that transistor 49 is turned on to its conductive state, thus turning off transistor 50 and terminating the output signal at output terminal 51.

The termination of the output signal has two simultaneous effects. The first of these is that it turns off clamping transistor 53 and this action unclamps point 41 from ground potential, reestablishing the functioning of door switches 28. The second effect is that it terminates the operating power applied over wire 56 to the subsequent portions of the pulsing circuit.

To summarize the operation of the timing circuit, it responds to the opening of a door by activating the entire pulsing circuit for a given interval of time, after which it returns the entire pulsing circuit to a quiescent state.

The establishment of selected timing intervals is well known to those skilled in the electronics art. These time intervals are readily obtained by the use of so-called "resistor/capacitor" combinations and this technique has been used in the disclosed circuitry. Referring back to FIG. 6, it will be seen that, during the active interval, while the left side of capacitor 55 is clamped to ground potential its upvolting current flows to capacitor 55 through resistor 44. Therefore, the value of resistor 44 has a major effect on the amount of electricity that flows into, and charges, capacitor 55. Moreover, the value of capacitor 55 itself also has a major effect on the rate at which it is charged up. Therefore, the values selected for the resistor 44/capacitor 55 combination establish the time interval during which the timing circuit will remain active. In the present case, the active interval is about 10 seconds, for reasons to be discussed presently.

Another thing should be noted about timing circuit 31; namely, once its active time interval has been reached, the timing circuit should be returned as quickly as possible to its quiescent state, in order that control is restored to the door switches, so that the system is free to report other intrusions. This quick return is accomplished as follows. Once clamping transistor 53 becomes non-conductive, resistor 39 quickly upvolts the now unclamped left side of capacitor 55 connected to point 41. Resistor 39 is selected to have a relatively small value, so that the upvolting effect is practically instantaneous.

Thus, once a truck door is opened, timing circuit 31 becomes activated for a given time interval, meanwhile activating a subsequent pulsing circuit for the same active time interval. At the end of the active interval, the entire pulsing circuit quickly returns to its quiescent state, ready to report another intrusion.

Oscillator

Attention is now directed to oscillator circuit 32 of FIG. 6. While any of a plurality of oscillator circuits may be used, FIG. 6 illustrates a type known as a "unijunction oscillator," due to the use of uni-junction transistor 57 therein. This particular type of oscillator is convenient because it produces, not only a sawtooth waveform (which is not used in the present circuit), but also produces a "spike" waveform 58 at output terminal 59, the spikes recurring in this case at a typical rate of about 10 per second. During the active interval, the spike waveform 58 is applied, over wire 61, to flip-flop 33.

Flip-Flop

It is known to those skilled in the electronics art that there is available a large variety of circuits known as "flip-flops", these having the characteristic of "flipping" between pre-established states. The flip-flop circuit 44 of FIG. 6 has two stable states (comparable to the two stable states of the usual light switch). During the active interval, the train of spikes in spike waveform 58 is applied continuously from oscillator 32, over wire 61, to flip-flop 33. Here a given spike acts as a trigger signal that causes the flip-flop circuit 33 to "flip" to one of its stable states. The next spike acts as a trigger signal that causes the flip-flop circuit to "flop" back to its original stable state. The subsequent spike acts as a trigger signal that causes the flip-flop circuit to again flip to its other stable state. This flip-flop action continues as long as suitable spike signals are applied to the flip-flop circuit.

It is a characteristic of flip-flop circuit 33 that its output terminal 62 produces a "square wave" waveform 63; and this waveform 63 has a repetition rate, or frequency, that is half that of the applied spike waveform 58, i.e., about 5 cycles per second.

Driver/Amplifier

For amplification, the square-wave waveform 63 at the output terminal 62 of flip-flop 33 is applied to a driver/amplifier 34, which may be a signal transistor, a series of cascaded transistors, a version of the well-known "Darlington" circuit, etc. In any case, the output of driver/amplifier 34 is applied to sending loop 26 which is mounted on the truck and here it causes pulses of reversing electric current to flow through the sending loop. These reversing-current pulses of electricity cause the sending loop 26 to produce reversing (changing) magnetic fields.

Damping Diode

It is known that when a reversing magnetic field is produced it may induce dangerously large voltages. In order to dissipate such large voltages, a damping diode 35 is connected across the terminals of the sending loop 26.

To recapitulate, once a truck door is opened, its associated door switch activates the timing circuitry for a predetermined interval of time. The output of the timing circuit, in turn, activates the subsequent pulsing circuitry, to cause the sending loop to produce a periodically reversing magnetic field for the duration of the active time interval.

Typical Numerical Values

It will be recalled from the previous discussion that timing circuit 31 is activated for a time interval of about 10 seconds; that oscillator circuit 32 has a frequency of about 10 Herz (cycles per second); and that flip-flop circuit operates at about half that frequency, resulting in about five reversing pulses per second. Therefore, once a truck door is opened, its associated door switch initiates an active interval that produces about fifty ($10 \times 10/2 = 50$) magnetic field reversals, whereupon the entire pulsing circuit reverts back to its quiescent state. The reason for these numerical values will become apparent from a latter discussion of the receiver circuitry.

Receiver

It will be recalled that the receiver comprises a pickup loop (21 of FIG. 2) that is preferably buried beneath the surface of the parking lot; and that every time that the sending loop 26 in the truck produces a change of magnetic field, pickup loop 26 produces a signal voltage, Since the pulsing circuit of FIG. 6 produces about 50 changes of the magnetic field, the pickup loop 21 produces about 50 signal voltages.

Figure 7:
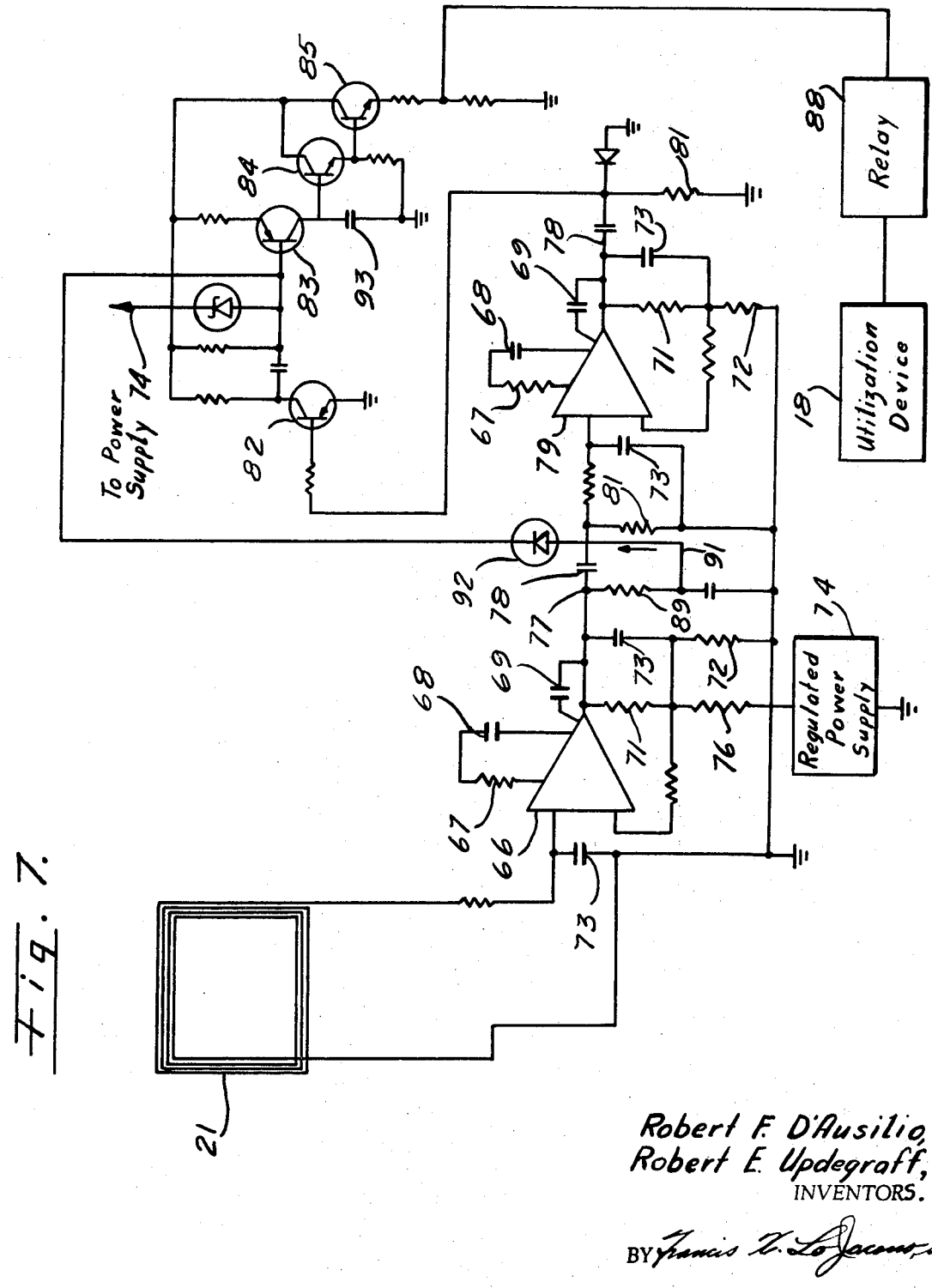
FIG. 7 shows a schematic diagram of the receiver portion of the system.

FIG. 7 illustrates a schematic diagram of an electronic circuit for such a receiver. As shown, pickup loop 21 applies the signal voltages to a well known "operational amplifier" 66; this amplifier using well known frequency compensation components 67, 68 and 69. Operational amplifier 66 also has gain-control components 71 and 72, and low-frequency bypass component 73.

Briefly stated, these components are desirable for the following reasons. As pointed out above, the signal voltages in the pickup loop 21 appear at a rate of about 5 per second; and the frequency-compensating components form a network that enhances the ability of the amplifier to amplify signals of this frequency.

Gain resistors 71 and 72, along with design parameters, cause operational amplifier 66 to achieve a gain of about 600. As a result, a greatly amplified signal voltage appears at the output terminal 77 of the operational amplifier 66.

At output terminal 77, a de-coupling capacitor 78 permits the amplified signal voltage to be applied to a subsequent amplifier 79, which may be a second operational amplifier designed capacitor 78 and resistor 81 form a high-frequency pass network.

As indicated, the output of the second operational amplifier 79 is applied to the base electrode of a transistor 82, whose output is then applied to subsequent transistors 83, 84 and 85. While various transistor configurations and interconnections may be used, FIG. 7 shows the two latter transistors to be connected in a Darlington arrangement to provide high-input impedance at base electrode of 84 while providing low-output impedance at emitter electrode of transistor 85.

The final output of transistor 85 is applied to a relay 88 to turn on an alarm-type utilization device 18.

The overall operation of the receiver, since there is no danger of discharging a battery, is such that it is always in its active state. When a signal voltage is received from pickup loop 21, it is immediately amplified and turns on the alarm-type utilization device 18.

False Alarms

A slight digression is desirable at this time, to discuss the problem of false alarms. In order to detect all intrusions, even under those conditions when the signal voltage from the pickup loop is quite weak, the circuitry of all intrusion systems is designed to have a high overall amplification. Unfortunately, a high amplification means that many spurious signals will be amplified to a large enough value so that the circuitry will treat them as though they were legitimate intrusion signals, thus producing a false alarm.

In the present case, the spurious signals may take the form of a changing magnetic field caused by changes in the variations of the earth's magnetic field, by electrical surges in nearby power lines, by passing traffic that may have magnetic characteristics, and the like. In order to avoid false alarms produced by such spurious conditions, reference is made to the foregoing discussion that a true intrusion into a protected truck will result in a train of about 50 signal voltages produced in a time interval of about 10 seconds. It is extremely improbable that spurious magnetic field variations would produce any such train of timed signal voltages, and the disclosed receiver circuit takes advantage of this situation in the following manner.

Referring to the receiver circuit of FIG. 7, the signal induced in loop 21 is accepted by amplifier 66 whose gain is controlled by resistors 71 and 72. This configuration is the well-known, voltage-follower, operational-amplifier circuit and has a voltage gain of about 600. Amplifier 79 is a similar circuit having a voltage gain of about 100 and is coupled to amplifier 66 and output 77 by means of capacitor 78. Output 77 is coupled through capacitor 78 and in the presence of a signal causes transistor 82 to turn on and off which in turn pulses transistor 83, thereby charging capacitor 93.

Capacitors 73 perform the function of a low-pass filter to reject 60Hz power line interference. Capacitor 78 in conjunction with resistor 81 form high-pass filters, and in combination with the low-pass elements from an effective band pass characteristics whose maximum response is the same as the pulser repetitive rate.

Thus, during the first 5 signal voltages, the counting means disables the receiver circuit so that it does not produce an output signal; but the fifth signal voltage charges up capacitor 93 to the potential that permits transistor 84 to become conductive. Therefore, the sixth signal voltage (and the subsequent 44 signal voltages) pass through the entire receiver circuit and produce an alarm as discussed above.

The utilization device 18, therefore, produces a series of about 45 horn blasts, light flashes, or the like. Alternatively, relay 88 may be of the latching type to produce a continuous horn blast, a continuously rotating lightbeam, or the like, relay 88 unlatching itself after a predetermined time interval or manually by the user.

Thus, the disclosed counting circuit counts the first five signal voltages to appear and holds the output circuit disabled during this time interval in order to prevent false alarms, but permits a true intrusion to sound the alarm.

It should be noted that sending loop 26 is operated for a very short interval, of about ten seconds, from a substantially fully-charged truck battery, so that an appreciable amount of battery power is available, thus producing a strong changing magnetic field. As a result of the strong changing magnetic field, the pickup loop 21 produces a strong signal voltage, and this strong signal voltage further minimizes the probability of false alarms.

Circuit Protection

Referring back to the receiver circuit of FIG. 7, the first operational amplifier 66 is designed to include a circuit-protection means so that there is normally a slight voltage at its upper input terminal during the quiescent portion of the system's operation, so that this slight voltage will cause a minute electric current to flow through the pickup loop 21 during the quiescent portion of the system's operation. This small electric current is used in the system design as part of the quiescent no-alarm condition, since the system responds only to changes of the magnetic field.

This condition is used as follows. If the intruder is slightly familiar with the disclosed intrusion alarm system, he may attempt to disable it by cutting the loop wires where they enter the first operational amplifier 66. However, if this is done, it removes the quiescent small voltage at the input terminal of the operational amplifier, causing its output 77 to drop to a negative voltage, thus causing conduction of diode 92 through resistor 89. This action, in turn, causes transistor 83 to conduct, thus activating relay 88 through transistors 84 and 85. In this way, the receiver circuit protects itself against disablement.

Referring now to FIGS. 8 and 9 in which there is shown an alternative arrangement of an electromechanical pulsing unit, generally indicated at 100, the unit 100 is designed to send intermittent pulses of electricity from the vehicle's battery through sending loop 26, as hereinbefore described. Included in the unit 100 is a pulser circuit 102 comprising a transistor 103, and a resistor 105 which receives the potential from the vehicle battery 106. When switch 28 opens, transistor 103 conducts, starting motor 107 and causing a 10° to 15° rotation of a cam 108 (also illustrated in FIG. 9). The cam is provided with a plurality of cam heads 109 and oppositely-disposed magnets 110 and 111, respectively. At least one of said magnets is always positioned opposite to that of a motor-winding, starter switch 112. As the transistor 103 energizes the motor winding 107, the cam plate rotates and magnet 110 is displaced, causing starter switch 112 to close, whereby the motor continues to rotate a one-half revolution, permitting magnet 111 to be oppositely positioned to that of the starter switch 112. When the cam is rotating, the cam heads 109 contact a cam follower 113 of the switch 114, thereby making and breaking contact when said cam is turning. This then supplies current to the sending loop 26 which is pulsed at a rate depending upon the revolution of the motor. Pulses are supplied during the one-half revolution of the cam, that is until one of the magnets 110 or 111 comes within range of the switch 112, at which time the motor turns off.

Summary

It may thus be realized that the disclosed Intrusion Alarm System has innumerable advantages over prior-art systems. First of all, it cannot produce nuisance false alarms during the vehicle's normal daily activities. Secondly, when the vehicle is parked at a protected parking lot, the system automatically goes into operation, so that there is no danger of a person forgetting to turn on the system. Thirdly, an intruder need merely open any of the vehicle's doors to produce an alarm. Fourthly, a late-arriving vehicle may even be parked adjacent to the protected parking lot in order to be covered by the system. Fifthly, the truck-mounted components can be easily transferred to another vehicle. Sixthly, the system offers self-protection against tampering. Seventhly, the system offers self-protection against tire theft by use of mercury switches to alarm whenever the vehicle is raised. Eighthly, a plurality of different types of alarms may be used. And, finally, the overall system is simple, economical, easy to install, and readily manufactured.

We claim:

1. The combination comprising:

a pickup wire, said pickup wire being adapted to produce a signal voltage when exposed to a changing magnetic field;

a vehicle having at least one door, said vehicle being parked adjacent said pickup wire;

transmitter means, associated with said door, for producing a changing magnetic field in the vicinity of said pickup wire when said door is opened, whereby said pickup wire transmits said signal voltage;

receiver means, associated with said pickup wire, for producing an alarm on the occurrence of said signal voltage.

2. The combination of claim 1 wherein said receiver means comprises control means for amplifying said signal voltage.

3. The combination of claim 2 including utilization means for producing an alarm when actuated by said amplified signal voltage from said control means.

4. The combination of claim 3 wherein said pickup wire comprises a pickup loop positioned peripherally around a parking lot.

5. The combination of claim 4 wherein said utilization means comprises a horn.

6. The combination of claim 4 wherein said utilization means comprises a flashing light.

7. The combination of claim 4 wherein said utilization means comprises a rotating-lightbeam, air-patrol light.

8. The combination of claim 4 wherein said utilization means comprises a self-dialer.

9. The combination of claim 4 wherein said transmitter means comprises a permanent magnet affixed to said door, said permanent magnet having an associated magnetic field that changes the ambient magnetic field at said pickup wire when said door is being opened.

10. The combination of claim 9 wherein said pickup loop comprises a plurality of secondary loops disposed within a given area in parking spaces of said parking lot.

11. The combination of claim 4 wherein said transmitter means comprises a sending loop positioned in said vehicle, pulsing means for causing said sending loop to conduct at least one pulse of electric current that produces a changing magnetic field, and switch means for activating said pulsing means when said door is open.

12. The combination of claim 4 wherein said receiver means includes a circuit protection means, whereby said receiver means protects itself against disablement of said loop.

13. The combination of claim 12 wherein said circuit protection means comprises a capacitor to perform as a low pass filter to reject 60Hz power line interference, a second capacitor, a resistor in conjunction with said second capacitor forming a high pass filter, whereby the combination of said low pass filter and said high pass filter form an effective band pass characteristic.

14. The combination of claim 11 wherein said switch means comprises a magnetic-reed switch mounted on said vehicle in proximity to said door; and means, comprising a magnet mounted on said door, for holding said magnetic-reed switch in a quiescent condition.

15. The combination of claim 11 wherein said pulsing means comprises timing means for disabling said pulsing means after a predetermined time interval.

16. The combination of claim 11 wherein said pulsing means comprises an oscillator circuit, a flip-flop circuit, means for applying the output of said oscillator circuit to said flip-flop circuit for causing said flip-flop circuit to produce a train of reversing waveforms; and means for applying said reversing waveforms to said sending loop, whereby said sending loop produces said changing magnetic field.

17. The combination of claim 11 wherein said pulsing means comprises a pulsing circuit having a motor therein and a cam means for controlling said movement of said motor.

18. The combination of claim 11 wherein said switch means includes a plurality of mercury switches centrally positioned at each end of said vehicle.

19. The combination of claim 14 wherein said receiving means includes counting means, and disabling means for causing said counting means to disable said control means for a given time interval, whereby the disabled time interval prevents the production of false alarms.

* * * * *